United States Patent [19]

Sweet

[11] 3,903,727

[45] Sept. 9, 1975

[54] SMOKE SAMPLING APPARATUS
[75] Inventor: Ervin J. Sweet, Trumbull, Conn.
[73] Assignee: Avco Corporation, Stratford, Conn.
[22] Filed: Nov. 30, 1973
[21] Appl. No.: 420,378

[52] U.S. Cl. .................................. 73/28; 55/97
[51] Int. Cl.² .................. G01N 31/00; B01D 46/18
[58] Field of Search ........ 73/28, 46, 421.5 R; 55/97

[56] References Cited
UNITED STATES PATENTS

| | | | |
|---|---|---|---|
| 3,138,015 | 6/1964 | Avery | 73/28 |
| 3,233,447 | 2/1966 | Horrell | 73/46 |
| 3,464,257 | 9/1969 | Schreiber et al. | 73/28 |
| 3,495,439 | 2/1970 | von Brand | 73/28 |
| 3,512,393 | 5/1970 | Weiss | 73/23 |
| 3,707,869 | 1/1973 | Raynor | 73/28 |

Primary Examiner—Charles A. Ruehl
Assistant Examiner—John S. Appleman
Attorney, Agent, or Firm—Charles M. Hogan; Irwin P. Garfinkle; Eugene C. Goodale

[57] ABSTRACT

A smoke sampling apparatus is disclosed which provides a means to determine the amount of solid matter contained in engine exhaust. A vacuum pump continuously withdraws a portion of the exhaust through a probe inserted in the exhaust path. The sample is passed through a filter paper supported within a test block wherein solid particles are collected on the filter paper. A bypass line is provided for sample passage during periods of nonsample testing. A pressure check of the test block is permitted prior to the taking of each sample test.

5 Claims, 2 Drawing Figures

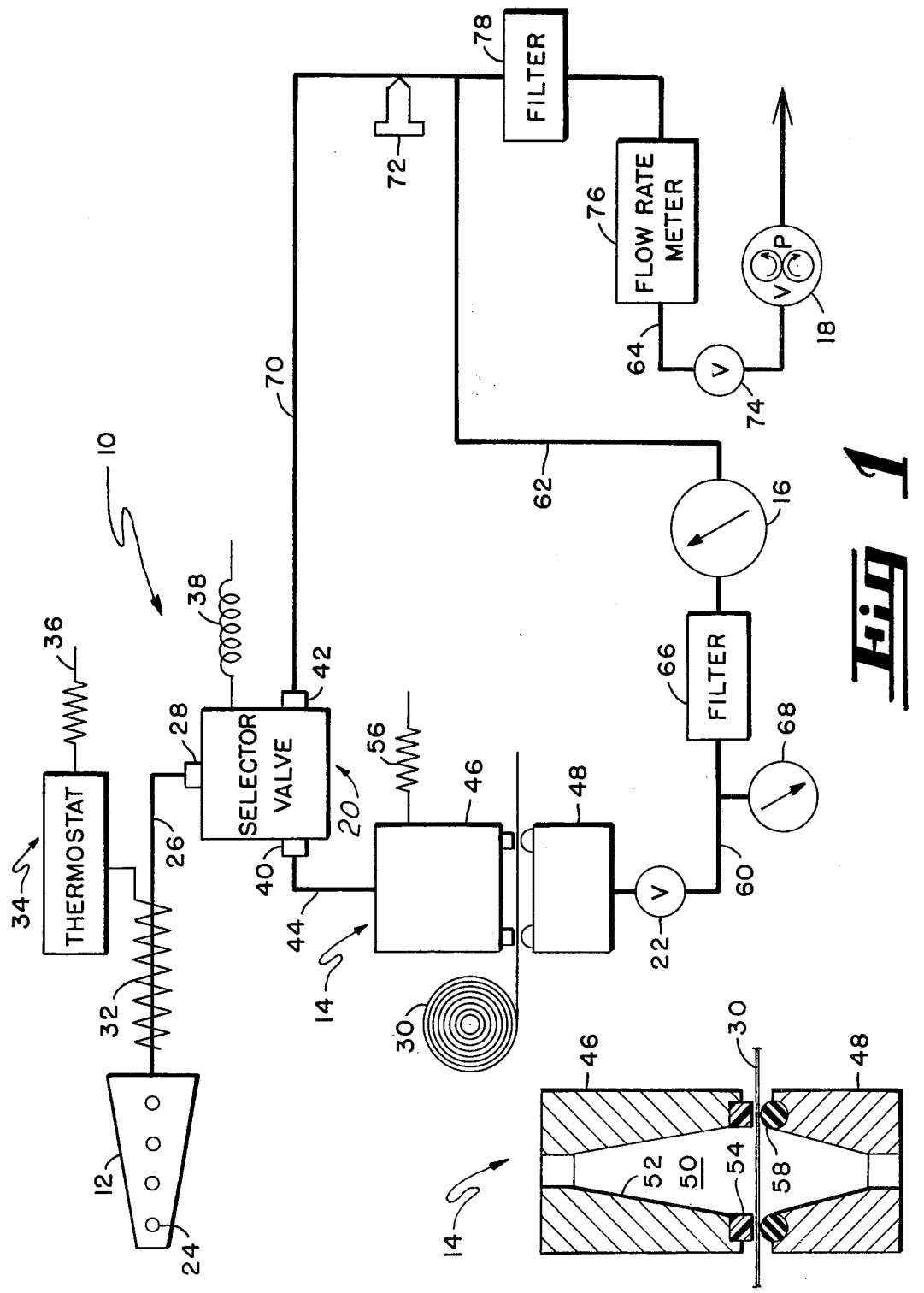

SMOKE SAMPLING APPARATUS

BACKGROUND OF THE INVENTION

This invention relates generally to smoke sampling apparatus and more particularly to an improved smoke sampling apparatus for use in determining the amount of smoke in engine exhaust.

Present engine smoke emission devices are not entirely satisfactory. Such devices generally utilize a wet gas meter and, accordingly, require a water seal in the test area. Accordingly, the use of the wet meter requires that the test be made downstream of the vacuum pump, which is not satisfactory. In addition, present devices only permit the making of a pressure check, i.e., to detect system leakage, only during the initial set up procedures. It is not possible to make a pressure check with the insertion of each new piece of filter paper. With devices of this type, errors can occur in the test data due to system leakage when new filter paper is inserted for each sample testing.

Accordingly, it is an object of this invention to provide a smoke sampling apparatus that will filter and accumulate a sample of smoke from engine exhausts and collect the smoke particles on filter paper.

A further object of this invention is to provide a smoke sampling apparatus utilizing a dry gas meter wherein the measurement of sample volume occurs upstream of the vacuum pump.

A still further object of this invention is to provide a smoke sampling apparatus in which a pressure check is taken for each sample to determine whether there is system leakage occurring.

And yet another object of this invention is to provide a smoke sampling apparatus having a probe which permits a constant flow velocity through the entire system.

And still another object of this invention is to provide a smoke sampling apparatus having accurate sample volume measurement wherein only the sampled flow goes through the gas meter.

And yet a still further object of this invention is to provide a smoke sampling apparatus in which the use of a dry meter therein permits nonlevel operation such as in a moving vehicle.

SUMMARY OF THE INVENTION

This invention provides a smoke sampling apparatus for sampling engine exhaust to determine the amount of solid matter in such exhaust. A vacuum pump draws a portion of the engine exhaust through a probe which is inserted in the exhaust. The exhaust is drawn through a test block having a filter paper supported therein such that the solid matter is collected therein. A bypass line permits continuous flow of the exhaust from the probe to the pump even during periods of nonsampling. A meter connected between the test block and the vacuum pump permits system leakage checking before each sample test.

Other objects, details, uses and advantages of this invention will become apparent as the following description of the exemplary embodiment thereof presented in the accompanying drawings proceeds.

BRIEF DESCRIPTION OF THE DRAWINGS

The accompanying drawings show a present exemplary embodiment of this invention in which:

FIG. 1 is a schematic representation of the smoke sampling apparatus of this invention; and FIG. 2 is a cross-sectional view of the test block utilized in the system of FIG. 1.

DESCRIPTION OF ILLUSTRATED EMBODIMENT

Reference is made to FIG. 1 of the drawings which illustrates one exemplary embodiment of the improved smoke sampling apparatus of this invention, which is designated generally by the reference numeral 10. The smoke sampling apparatus 10 is comprised generally of a probe 12, test block 14, test meter 16, vacuum pump 18, a selector valve 20 and an isolation valve 22. Suitable ducting or tubes interconnect the various components of the apparatus 10, as will be described hereinbelow.

The probe 12 is tapered in shape and is formed with a plurality of apertures 24 axially spaced therealong. The probe 12 is adapted to be inserted in the exhaust path of an engine such that a portion of the exhaust is drawn through the probe 12 due to the action of the vacuum pump 18. The probe is tapered to provide a nearly constant internal sample velocity. The sample velocity is that which is maintained through the sample line tube 26 which connects the probe 12 with the inlet 28 of the selector valve 20.

The tube 26 may be any suitable tubing such as ¼ inch copper tubing or the like. The exhaust sample must be maintained at over 100°F. to insure against moisture accumulation in the system lines or on the filter paper 30. Accordingly, suitable heating means such as a heating cable 32 is wrapped about line 26 to maintain a proper temperature of the sample passing therethrough. Thermostat 34 permits adjustment of the heating cable 32 so as to maintain the proper temperature. The heating cable 32 and thermostat 34 are connected by lead 36 to a suitable power source (not shown). The thermostat 34 may be manually controlled or the thermostat may be electrically connected by suitable means with a thermocouple lead 38 for automatic control. The thermocouple 38 is inserted into the bypass outlet 42 of the selector valve 20 to monitor the temperature of the gas sample passing therethrough.

The selector valve 20 has a test outlet 40 and a bypass outlet 42. The valve 20 is any suitable three-way valve having positive switching from one outlet to the other without leakage in either position. It has been found that a HOKE three-way valve will meet this requirement such that the valve 20 provides a full flow straight through passage in the sample or test mode.

Line 44 connects the valve outlet 40 with the inlet to the test block 14. As best seen in FIG. 2, the test block 14 is comprised of an inlet block 46 and an outlet block 48. The test blocks 46 and 48 provide for an expansion passage 50 and seal to insure uniform staining of the filter paper 30 over a well defined cross section. The passage 50 of the inlet block 46 is defined by the angled internal walls 52 extending from the inlet fitting to a 0.680 inch inside diameter square seal 54 of suitable material such as Teflon. A small resistance heater 56 is inserted in the inlet block 46 to prevent condensation on the polished metal surfaces 52.

Suitable filter paper 30, such as Whatman No. 4, is inserted between the inlet block 46 and the outlet block 48. The outlet block 48 is provided with a suitable O-ring 58 of rubber or the like. When the blocks 46 and 48 are clamped together by suitable means such as a retracting clamp (not shown) suitable sealing pressure is applied between the seals 54 and 58 to prevent leakage edgewise through the paper. The use of the square seal 54 insures that the area of the filter paper exposed to the gas sample does not vary from test to test.

The isolation valve 22 is operatively mounted in the line 60 which connects the outlet of the block 48 with the meter 16. The valve 22 can be any suitable zero leakage on-off valve. A suitable valve of this nature can be of the petcock type. The valve 22 is used to isolate the test block 14 as will be explained hereinbelow.

The meter 16 is connected between the test block 14 and the vacuum pump 18 by lines 60, 62 and 64. The meter 16 is a dry gas type test meter. An example of such a meter is American Meter Co. portable respiratory test meter (AIM-500) which will operate with only a few tenths of an inch of water pressure drop. A filter 66 is connected at the meter inlet and is used to protect the meter calibration which would be affected by smoke deposits. A pressure gauge 68 is mounted upstream of the meter 16.

A bypass line 70 connects the outlet 42 of valve 20 with line 64. A needle valve 72 is operatively connected in line 70 and is used to set the bypass flow to be equal to the sample flow as measured by the flow meter 76. The needle valve 72 can be considered to provide the same resistance to flow as the resistance of the filter paper 30 for a given engine discharge pressure condition.

A vacuum relief valve 74 is connected in line 64 and is set at 10 inches Hg vacuum. The relief valve 74 protects the meter 16 and pump 18. Suitable flow rate meter 76 is operatively connected with line 64 to insure that the gas valocity through the system remains nearly constant and between specified limits at all times. Any settling of particulate matter in any of the lines will necessarily affect the flow rate which will be detected through observation of the meter 76. Filter 78 is connected upstream of the meter 76.

To prepare the smoke sampling apparatus 10 for gas sampling, the heating cable 32 and test block heater 56 are turned on. The thermostat 34 is set for 150°F. The selector valve 20 is turned to the bypass mode and the isolation valve 22 is turned to isolation or OFF. At this point, clean filter paper 30 is inserted into the test block 14 and the test block 14 is clamped thereupon. The vacuum pump 18 is turned ON. The relief valve 74 is adjusted until the gauge 68 reads 10 inches Hg. The system is checked for leakage by turning the isolation valve 22 to the test or ON position. The gas meter 16 will register flow therethrough until the ambient air in the line 44, test block 14 and line 60 are evacuated. If there is no leakage in the system the gas meter will show zero flow. To be acceptable, leakage in the system must be below two and one-half tenths liter per minute. If leakage is present as indicated on the gas meter 16, the seal in the test block should be checked. Slight additional pressure applied between blocks 46 and 48 is generally adequate to stop any leakage occurring therein. The selector valve 20 is now turned to the test mode and approximately 20 liters of air are drawn through the filter paper 30. If any soiling of the paper 30 occurs, the apparatus must be cleaned by continuous running of air through the filter paper until such time as the filter paper is not soiled by a 20 liter sample. When the system is in the clean condition, the selector valve 20 is turned to the bypass mode such that air passing therethrough is directed to bypass line 70 and the isolation valve 22 is turned to the OFF position. The vacuum pump 18 may be turned OFF if the engine to be tested is not ready to be sampled. The test block heater 56 may be turned OFF and ON as required to maintain the temperature of the block hot, but comfortable to handle.

When the engine is at test condition, the probe 12 having been previously positioned in the exhaust flow path, the isolation valve 22 is switched to ON to check for system leaks. The selector valve 20 is then switched to the test mode. It is, of course, understood that clean filter paper 30 has been previously clamped within the test block 14. The gas temperature at the selector valve 20 must be over 100°F. and the flow rate through the flow rate meter 76 must be as required by appropriate specifications. If the flow is not within these specification limits, the vacuum relief valve may be adjusted to obtain the proper flow rate. The flow rate should be set at the maximum allowable flow range since the flow rate will decrease as the solid particles are accumulated on the filter paper 30. If the gas pressure at probe 12 is too high, an additional throttle valve is necessary in line 60 between isolation valve 22 and pressure gauge 68. In this case the flow rate is established by throttling the sample flow through flow rate meter 76 while maintaining a vacuum adjustment with vacuum relief valve 74. The selector valve 20 is turned to the bypass mode and the isolation valve 22 is turned OFF. The needle valve 72 is then adjusted until the same flow rate as indicated by meter 76 occurs in the bypass line 70 as through the test line.

When the flow in the bypass line 70 is the same as previously adjusted for the test line, the apparatus 10 is ready for sampling and testing of the engine exhaust. To make the test, clean filter paper 30 is clamped in the test block 14. The isolation valve 22 is turned ON and the check for leakage is run by observing the meter 16. The selector valve 20 is then switched to the test mode at which point engine exhaust is drawn through the probe 12 to the vacuum pump 18 via test block 14. Solid particles in the exhaust will be accumulated on the filter paper 30. As many test samples can be taken as desired. At the completion of the testing, the respective filter papers may be observed through known techniques, such as the use of a reflectometer, to determine the smoke density or optical density.

It can be seen that the smoke sampling apparatus of this invention permits a leakage test prior to the taking of each sample. The apparatus may be operated in any orientation due to the use of the dry gas meter. Adjustments are provided to insure a constant flow in both the bypass and test modes of operation. Accordingly, it can be seen that the objectives hereinbefore set forth have been accomplished.

While a present exemplary embodiment of this invention has been illustrated and described, it will be recognized that this invention may be otherwise variously embodied and practiced by those skilled in the art.

What is claimed is:

1. A smoke sampling apparatus for determining the amount of solid matter in engine exhaust comprising:
   a probe positionable in the engine exhaust flow path, said probe capturing a portion of the exhaust passing thereby;
   a continuously operating vacuum pump;
   valve means for selectively operatively connecting said probe with a test line or a bypass line, said valve means having an inlet operatively connected with said probe and first and second outlets, said first outlet being open during a bypass and leak check mode and closed during a test mode, said second outlet being open during a test mode and closed during a bypass and leak check mode;

a bypass line operatively connecting said probe with said vacuum pump wherein gas exhaust is continuously drawn from said probe to said vacuum pump through said first outlet in the bypass mode;

a test line operatively connecting said probe with said vacuum pump wherein gas exhaust is continuously drawn from said probe to said vacuum pump through said second outlet in the test mode;

a test block connected in series with said test line, said test block defining a flow path therethrough;

filter paper secured in said test block across said flow path to accummulate solid particles thereon as gas exhaust is drawn therethrough; and an isolation valve connected between said test block and said vacuum pump to permit leakage checking of the said test block before each test sample of gas exhaust is drawn therethrough, said isolation valve being open during the leak check mode and the test mode and being closed during the bypass mode.

2. The smoke sampling apparatus as set forth in claim 1 in which said test block comprises an inlet block and an outlet block, the inlet block having a predetermined interior shape to define a predetermined flow path area, a seal secured on one end of said inlet block and extending about the perimeter of the flow path area; said outlet block having a seal secured to one end thereof for cooperative engagement through the filter paper with said inlet block seal wherein clamping pressure applied thereto provides a leakproof seal, said seal comprising a ring seal having a rectangular cross-sectional configuration in contact with a seal ring having a circular cross-sectional configuration, said seal means thereby precisely defining the perimeter of the flow path area.

3. The smoke sampling apparatus as set forth in claim 2 in which said test block is shaped as a diffuser whereby smoke particles passing therethrough are evenly distributed on said filter paper.

4. The smoke sampling apparatus as set forth in claim 1 in which said valve means is a three-way valve; and further comprising a meter connected in said test line between said isolation valve and said vacuum pump, said meter providing an indication of flow and leakage through said test block.

5. The smoke sampling apparatus as set forth in claim 4 in which said probe is tapered, said probe including a plurality of apertures axially spaced therealong to capture a portion of the gas exhaust passing thereby wherein a nearly constant internal gas sampling velocity is obtained in the lines; heating means for preventing condensation of the gas sample; and means for balancing the flow in said bypass line to equal the flow in said test line.

* * * * *